United States Patent [19]
Ishizuka

[11] Patent Number: 6,163,115
[45] Date of Patent: Dec. 19, 2000

[54] HIGH-PRESSURE DISCHARGE LAMP LIGHTING APPARATUS SYSTEM

[75] Inventor: Akio Ishizuka, Yokohama, Japan

[73] Assignee: Toshiba Lighting & Technology Corp., Tokyo, Japan

[21] Appl. No.: 09/322,031

[22] Filed: May 28, 1999

[30] Foreign Application Priority Data

May 28, 1998 [JP] Japan .................................. 10-146978

[51] Int. Cl.$^7$ ..................................................... G05F 1/00
[52] U.S. Cl. ........................ 315/308; 315/307; 315/224; 315/82
[58] Field of Search .................................... 315/308, 307, 315/82, 77, 78, 112, 117, 118, 224, 225, 291, 309, 276, 274, 209 R, 297, DIG. 7

[56] References Cited

U.S. PATENT DOCUMENTS

| | | | |
|---|---|---|---|
| 5,142,203 | 8/1992 | Oda et al. | 315/308 |
| 5,151,631 | 9/1992 | Oda et al. | 315/127 |
| 5,295,036 | 3/1994 | Yagi et al. | 361/79 |
| 5,449,973 | 9/1995 | Yamashita et al. | 315/82 |
| 5,485,061 | 1/1996 | Ukita et al. | 315/307 |
| 5,751,121 | 5/1998 | Toyama et al. | 315/307 |
| 5,910,712 | 6/1999 | Toyama | 315/307 |
| 6,008,594 | 12/1999 | Kita et al. | 315/307 |
| 6,034,487 | 3/2000 | Yamashita et al. | 315/244 |

*Primary Examiner*—Don Wong
*Assistant Examiner*—Tuyet T. Vo
*Attorney, Agent, or Firm*—Pillsbury Madison & Sutro LLP

[57] ABSTRACT

A lamp voltage detecting section detects the lamp voltage of the high-pressure discharge lamp and transmits it to a current calculating section. A lamp current detecting section detects the lamp current of the high-pressure discharge lamp and transmits it to a differential amplification circuit. A target power value to be supplied to the high-pressure discharge lamp is input to the current calculating section from a target setting device. The current calculating section divides the target power value by the lamp voltage detected by the lamp voltage detecting section to calculate a target current value, and transmits the target current value to the differential amplification circuit. A control section controls the chopping operation of a semiconductor switch so as to make the target current value approximate to the lamp current value. A capacitor of a timer circuit is charged with a current correlating with the target power value simultaneously with the operation of the target power setting device, and discharging is executed when the high-pressure discharge lamp is turned off. When the operation is started, the target power setting device sets the target power value on the basis of the charging voltage of the capacitor, and allows the target power value to be varied in response to the duration of operations.

10 Claims, 4 Drawing Sheets

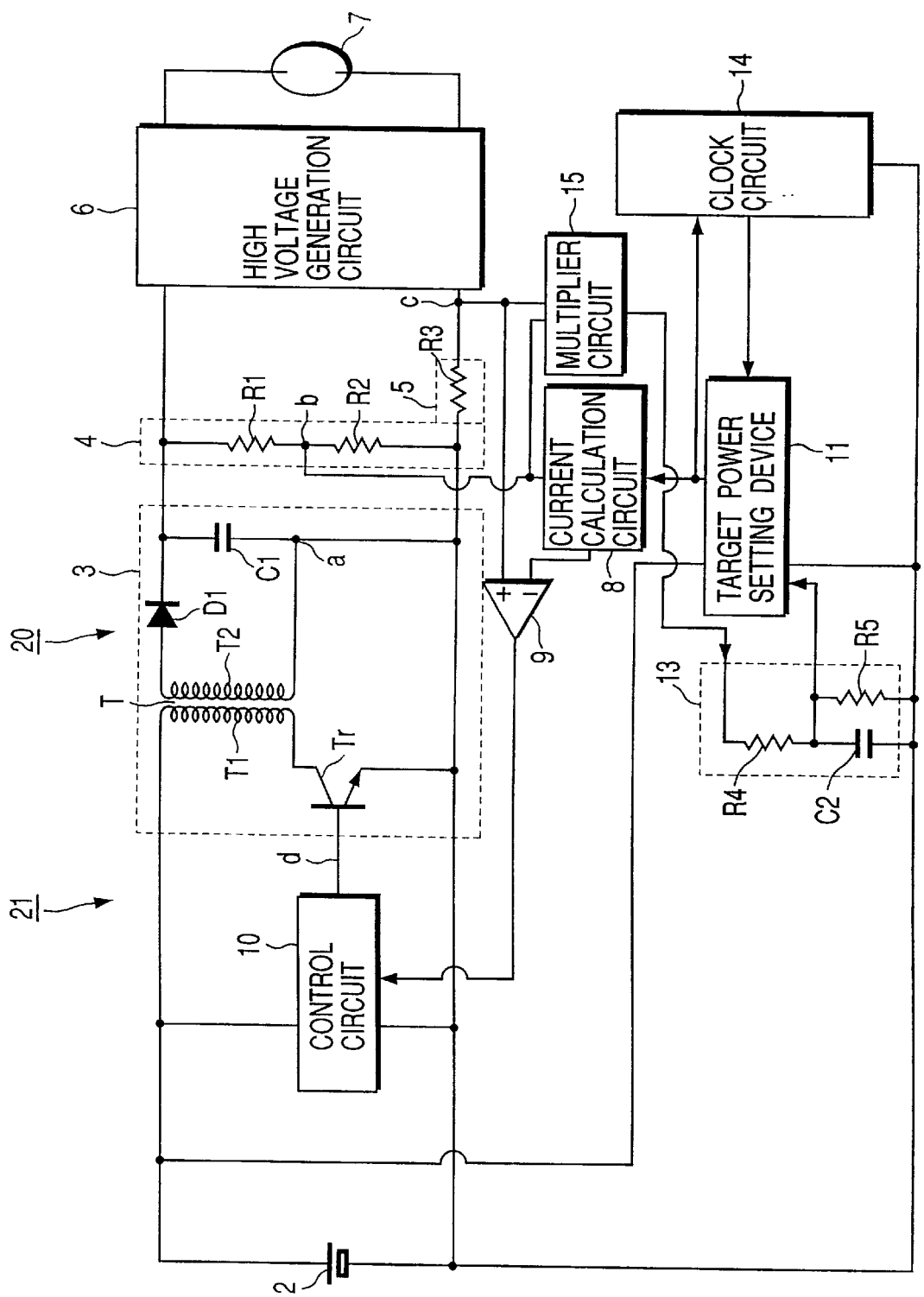
F I G. 3

HIGH-PRESSURE DISCHARGE LAMP LIGHTING APPARATUS SYSTEM

BACKGROUND OF THE INVENTION

The present invention relates to a high-pressure discharge lamp lighting apparatus system and, more particularly, to a high-pressure discharge lamp lighting apparatus system including a lighting apparatus for lighting a high-pressure discharge lamp such as a headlight of a vehicle, a high-pressure discharge lamp lighting apparatus, a lighting unit comprising the high-pressure discharge lamp lighting apparatus, and a vehicle in which the lighting unit is loaded.

In a conventional lighting apparatus used as a headlight of a vehicle to light a high-pressure discharge lamp, for example, luminous flux emitted from the high-pressure discharge lamp is made to rise quickly by supplying overcurrent to the high-pressure discharge lamp in a period immediately after the start of lighting until the lamp voltage rises adequately.

In addition, the conventional high-pressure discharge lamp lighting apparatus is constituted to supply a constant power to the high-pressure discharge lamp, in order to reduce the variation of the luminous flux emitted from the high-pressure discharge lamp in accordance with the irregularity in the characteristics or the characteristic variation based on the lifetime and the like in the high-pressure discharge lamp, in a stable state.

Incidentally, in the high-pressure discharge lamp of this kind, when turning on and turning off are repeated, its temperature variation causes the vapor pressure of a luminescent metal sealed therein to be varied and thereby the characteristics are varied.

For this reason, in the high-pressure discharge lamp for a headlight of a vehicle as described in, for example, Jpn. Pat. Appln. KOKAI Publication No. 10-41075 (prior art), the power to be supplied to the lamp is controlled in accordance with a state of a cold lamp (a cold state) or a state of a hot lamp (a hot state).

As shown in FIG. 6, a high-pressure discharge lamp lighting apparatus 40 of the prior art comprises a lighting control circuit 41, a charging/discharging circuit 42 that is a series circuit constituted by a resistor R and a capacitor C, a stable lighting discrimination circuit 43, a power supply resetting circuit 44 and a level resetting circuit 45.

The charging/discharging circuit 42 constitutes a time measurement circuit for measuring the ON/OFF time of the power supply.

The lighting control circuit 41 adjusts the power to be supplied to a lamp (not shown) by a lighting circuit (not shown) on the basis of a value of terminal voltage Vc of the capacitor C.

The stable lighting discrimination circuit 43 discriminates whether the lamp is in the hot state or not. When the terminal voltage Vc is higher than the discrimination reference value, i.e. when the lamp is in the hot state, the stable lighting discrimination circuit 43 outputs stable lighting discrimination signal Ss that is to be at high level to the level resetting circuit 45.

The power supply resetting circuit 44 operates the lighting control circuit 41 if a predetermined resetting period has passed, when the power supply is turned on.

The level resetting circuit 45 charges the capacitor C during the resetting period when the stable lighting discrimination signal Ss is at high level.

That is, when the power supply is turned on (or when the lamp is lit up again), if the lamp is in the hot state, the capacitor C is charged and the lighting control circuit 41 restricts the power to be supplied to the lamp on the basis of the terminal voltage Vc of the capacitor C, during a predetermined resetting period.

The high-pressure discharge lamp lighting apparatus 40 of the above-described prior art can restrict the supply of the power in quantities more than necessary ones to the lamp when turning on and off the power supply (or turning on and off the lamp) is repeated in a short time, after the high-pressure discharge lamp has been in the stable state.

However, the discrimination reference value is used to discriminate whether the lamp is in the hot state or not, and the power to be supplied to the lamp at the voltage near the terminal voltage Vc is varied in stages.

If the terminal voltage Vc of the capacitor C is higher than the discrimination reference value, the capacitor C is charged during a predetermined resetting period even when the value of the terminal voltage Vc is a value near the discrimination reference value or a value at which the capacitor C is fully charged, and therefore the power to be supplied to the lamp is substantially the same, which means the power in the stable state.

On the other hand, if the terminal voltage Vc of the capacitor C is lower than the discrimination reference value, the overvoltage is supplied to the lamp even when the value of the terminal voltage Vc is near the discrimination reference value at which the lamp is in the hot state.

As described above, the high-pressure discharge lamp lighting apparatus 40 has the drawback that the power supplied to the lamp is varied in stages with reference to the discrimination reference value and thereby an optimal power responding to the lamp temperature cannot be supplied.

BRIEF SUMMARY OF THE INVENTION

The present invention is accomplished in consideration of the above problems, and its object is to provide a high-pressure discharge lamp lighting apparatus system having a lighting apparatus for a high-pressure discharge lamp that can supply an optimal power to the lamp in accordance with the state of the lamp temperature when the lamp is turned on and off, a high-pressure discharge lamp lighting apparatus, a lighting unit comprising the high-pressure discharge lamp lighting apparatus, and a vehicle in which the lighting unit is loaded.

In order to achieve the above object, according to the first aspect of the present invention, there is provided a lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting a target power value to be supplied from the power conversion device to the high-pressure discharge lamp;

power detection means for detecting quantity of electricity correlating with power supplied to the high-pressure discharge lamp;

control means for controlling an operation of the semiconductor switch of the power conversion device so as to make the target power value set by the target power setting device approximate to the quantity of electricity detected by the power detection means; and a charging circuit having a capacitor constituted to be charged with a current correlating with the target power value set by the target power setting device, wherein the target power setting device sets the target power value on the basis of a charging voltage of the capacitor in the charging circuit when operations are started, and lowers the target power value in accordance with a duration of operations.

In the inventions of this aspect and the following aspects, definition and technical meaning of terms are determined as mentioned below unless they are noted particularly.

The high voltage generated from the high-voltage generation circuit indicates a voltage needed to turn on the high-pressure discharge lamp connected thereto and implies, for example, the high voltage shaped in a rectangular wave, a sine wave and the like.

The power conversion device may be a DC-DC converter, a chopper circuit or an inverter circuit.

The quantity of electricity correlating with the power means the voltage corresponding to the power, the current and the power.

The current correlating with the target power value is an electric current proportional to or approximately proportional to the target power value.

Any charging means and any structure of the capacitor of the charging circuit may be employed if it is charged with the electric current correlating with the target power value.

It is preferable that discharging from this capacitor should be executed in a long time (for example, five minutes).

In the above structure, the high-voltage generation circuit generates and applies the high voltage to the high-pressure discharge lamp to turn on the high-pressure discharge lamp.

The target power setting device sets the target power value on the basis of the charging voltage of the capacitor of the charging circuit when the operation of the target power setting device is started.

The control means controls the chopping operation of the semiconductor switch of the power conversion device so as to make the set target power value approximate to the power detected by the power detection means.

Charging the capacitor of the charging circuit with the current correlating with the target power value is started.

After that, the target power setting device renews to lower the target power value in accordance with the duration of the operation.

Thus, an optimal power is supplied to the high-pressure discharge lamp in accordance with the duration after the operation has been started.

According to the second aspect of the present invention, there is provided a lighting apparatus for a high-pressure discharge lamp, comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting power to be supplied from the power conversion device to the high-pressure discharge lamp;

lamp voltage detection means for detecting lamp voltage of the high-pressure discharge lamp;

lamp current detection means for detecting lamp current of the high-pressure discharge lamp;

current calculation means for dividing a target power value set by the target power setting device, by the lamp voltage detected by the lamp voltage detection means, to calculate a target current value;

control means for controlling an operation of the semiconductor switch in the power conversion device so as to make the target current value calculated by the current calculation means approximate to the lamp current value detected by the lamp current detection means; and a timer circuit having a resistor and a capacitor constituted to be charged with current correlating with the target power value, wherein the target power setting device is constituted to set the target power value on the basis of charging voltage of the capacitor in the timer circuit when operations are started, and to be capable of varying the target power value in accordance with a duration of operations.

The lamp voltage detection means may detect the lamp voltage directly or indirectly.

The lamp current detection means may detect the lamp current directly or indirectly.

In the above structure, when the operations are started, the current calculation means divides the target power value that is set by the target power setting device on the basis of the charging voltage of the capacitor of the timer circuit, by the lamp voltage detected by the lamp voltage detection means, to calculate the target current value.

The control means controls the chopping operation of the semiconductor switch of the power conversion device so as to make the target current value approximate to the lamp current value detected by the lamp current detection means.

Charging the capacitor, of the timer circuit having the resistor and the capacitor, with the electric current correlating with the target power value is started similarly to the first embodiment. In order to allow the target power setting device to vary the target power value, an optimal power is supplied to the high-pressure discharge lamp in accordance with the operation start time.

According to the third aspect of the present invention, the capacitor has discharge characteristics correlating with the variation in temperature drop after the high-pressure discharge lamp has been turned off, in the lighting apparatus for a high-pressure discharge lamp according to the first or second aspect.

Since the discharge characteristics of the capacitor correlate with the lamp temperature, the voltage of the capacitor is also decreased in accordance with the temperature drop in the lamp.

The target power setting device sets the target power value to be supplied to the lamp in accordance with the voltage of the capacitor when it is turned on.

That is, since an optimal power is supplied in accordance with the lamp temperature, in the duration after the lamp has been turned off or, in other words, when the operation is started, the luminous flux emitted from the lamp can rise quickly and the life of the lamp can be made longer.

According to the fourth aspect of the present invention, the lighting apparatus for a high-voltage discharge lamp according to the above first to third aspects comprises a clock means for clocking the duration of the operation, and the target power setting device renews the target power value in accordance with the duration clocked by the clock means.

It is preferable that clocking the duration of the operation should be started synchronously with the start of lighting of the high-pressure discharge lamp. However, the duration may be clocked indirectly.

That is, in the above structure, after the operation has been started, the lamp temperature rises and the lamp voltage also rises as the time goes by. For this reason, the target power setting device allows the target power value to be renewed (lowered) in accordance with the clocked duration.

Since an optimal power is supplied to the high-pressure discharge lamp in accordance with the state of the lamp temperature, the life of the lamp can be made longer.

Further, the high-pressure discharge lamp lighting apparatus according to the fifth and sixth aspects of the present invention comprises the lighting apparatus for a high-pressure discharge lamp according to the above first and second aspects and the high-pressure discharge lamp energized by the power conversion device of this lighting apparatus for a high-pressure discharge lamp.

The high-pressure discharge lamp lighting apparatus is constituted by adding the high-pressure discharge lamp to the lighting apparatus for a high-pressure discharge lamp according to the above first and second aspects, and has the functions described in the above first and second aspects.

In addition, according to the high-pressure discharge lamp lighting apparatus according to the seventh aspect of the present invention, the high-pressure discharge lamp is a non-mercury-contained lamp that does not seal mercury in an arc tube thereof, in the high-pressure discharge lamp lighting apparatus according to the fifth or sixth aspect.

The non-mercury-contained lamp indicates a lamp in which mercury is not substantially contained and implies, for example, a lamp in which a metal halide that is a luminescent metal is mainly sealed.

Since the luminous flux emitted from the lamp rises more quickly in this non-mercury-contained lamp than in the mercury-contained lamp, the period of the overvoltage supplied to the lamp can be shortened when it is turned on.

In addition, the lighting unit according to the eighth and ninth aspects of the present invention comprises the high-pressure discharge lamp lighting apparatus according to the above fifth and sixth aspects, and a lighting fitting main body having a light control means for controlling the light emitted from the high-pressure discharge lamp.

According to this structure, a lighting unit that receive an optimal power in accordance with the state of the lamp temperature, makes the luminous flux rise quickly and can make the life of the lamp longer, can be provided.

In addition, according to the lighting unit according to the tenth aspect of the present invention, the lighting unit of the eighth and ninth aspects is loaded on a vehicle, and the light control means of the lighting unit is applicable as a headlight for the vehicle.

According to this structure, since the invention comprises the high-pressure discharge lamp lighting apparatus that can supply an optimal power to the lamp in accordance with the state of the lamp temperature when the operation is started, keep the luminous flux rise and make the life of the lamp longer, a vehicle of high reliability can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing an arrangement of a high-pressure discharge lamp lighting apparatus according to the second embodiment of the present invention;

DETAILED DESCRIPTION OF THE INVENTION

Figure 1:
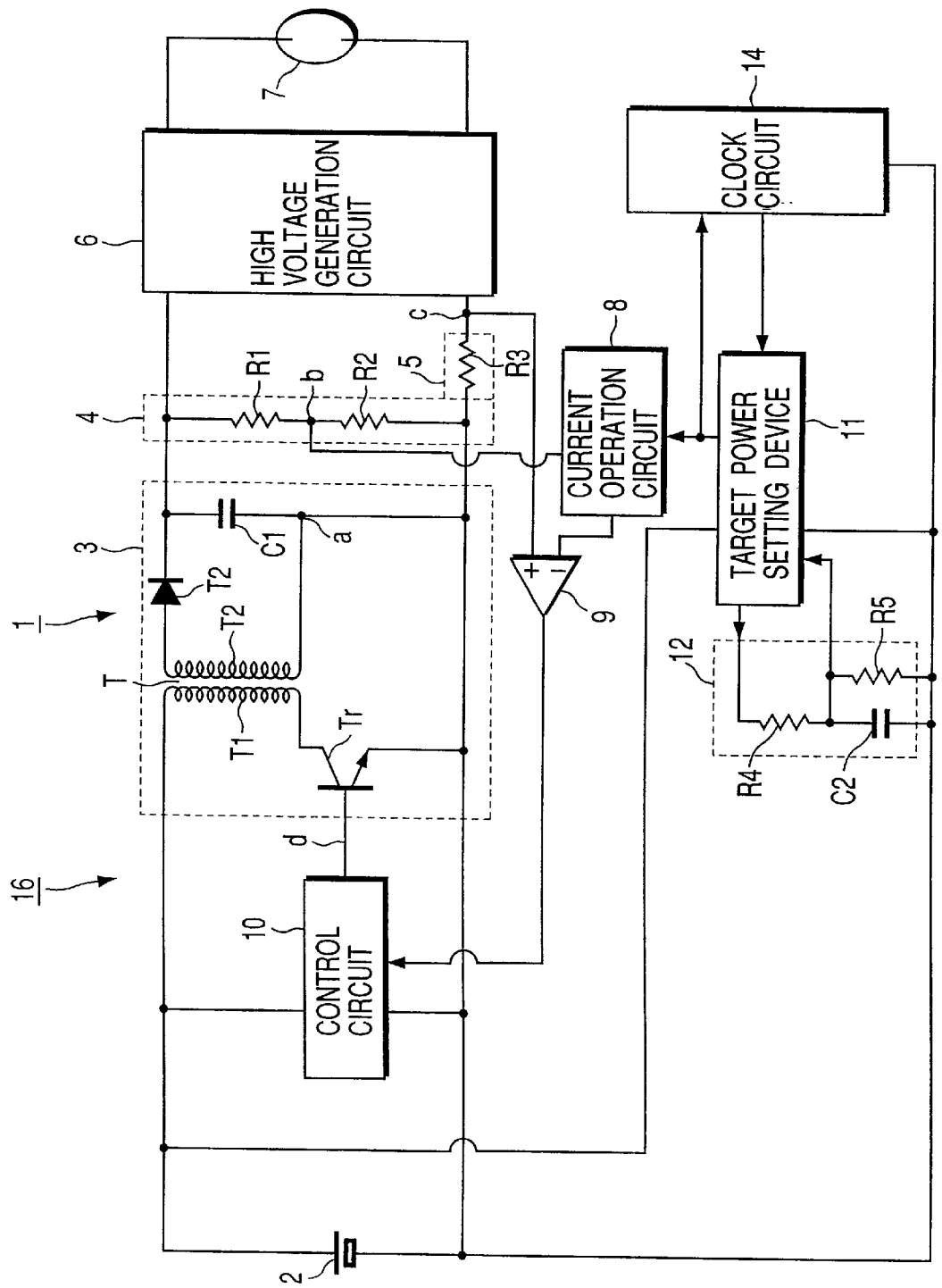
FIG. 1 is a block diagram showing an arrangement of a high-pressure discharge lamp lighting apparatus according to the first embodiment of the present invention.

Reference will now be made in detail to the presently preferred embodiments of the invention as illustrated in the accompanying drawings, in which like reference characters designate like or corresponding parts throughout the several drawings.

The embodiments of the present invention will be explained below with reference to the drawings.

FIG. 1 is a circuit diagram showing a high-pressure discharge lamp lighting apparatus according to the first embodiment of the present invention.

A high-pressure discharge lamp lighting apparatus 1 shown in FIG. 1 is constituted by a direct-current power supply 2, a power converting device 3, a lamp voltage detection circuit 4, a lamp current detection circuit 5, a high-voltage generation circuit 6, a high-pressure discharge lamp 7, a current operation circuit 8, a differential amplification circuit 9, a control circuit 10, a target power setting device 11, a timer circuit 12, a clock circuit 14 and the like.

A high-pressure discharge lamp lighting apparatus 16 can be obtained by removing the discharge lamp 7, or the direct-current power supply 2 and the discharge lamp 7 from the high-pressure discharge lamp lighting apparatus 1.

The direct-current power supply 2 may be a battery, a direct-current power supply device, or a power supply obtained by rectifying, or rectifying and smoothing a commercial indirect-current power supply.

A primary coil T1 of a step-up transformer T in the power converting device 3 and a series circuit of a transistor Tr serving as a semiconductor switch are connected to the direct-current power supply 2.

A smoothing capacitor C1 is connected to a secondary coil T2 of the step-up transformer T through a diode D1.

The emitter of the transistor Tr and an end a of the secondary coil T2 in the step-up transformer T are common.

The power converting device 3 is a flyback DC-DC converter chops the direct current from the direct-current power supply 2.

The high-pressure discharge lamp 7 is connected to the output side of the power converting device 3, i.e. both ends of the smoothing capacitor C1 through the high-voltage generation circuit 6.

The high-pressure discharge lamp 7 is, for example, a metal halide lamp of the rated power at 35 W.

The high-voltage generation circuit 6 generates a high-voltage pulse, applies the high-voltage pulse and starts the high-pressure discharge lamp 7.

The lamp voltage detection circuit 4 that is a series circuit of resistors R1 and R2 and that serves as a voltage detecting means is connected to the output side of the power conversion circuit 3.

The lamp current detection circuit 5 of a resistor R3 serving as a lamp current detecting means is inserted between the lamp voltage detection circuit 4 and the high-voltage generation circuit 6.

The lamp voltage detection circuit 4 and the lamp current detection circuit 5 detect the lamp voltage and the lamp current of the high-pressure discharge lamp 7, respectively.

A junction point b provided between the resistors R1 and R2 is connected to the input side of the current operation circuit 8 serving as a current operating means.

The input side of the current operation circuit 8 is also connected to the output side of the target power setting device 11.

The input side of the current operation circuit 8 is also connected to an inverse input terminal of the differential amplification circuit 9.

The lamp voltage from the lamp voltage detection circuit 4 and the target power value from the target power setting device 11 are input to the current operation circuit 8.

The current operation circuit 8 operates the target current value and outputs it to the inverse input terminal of the differential amplification circuit 9 by dividing the target power value by the lamp voltage.

An non-inverse input terminal of the differential amplification circuit 9 is connected to a junction point c provided between the resistor R3 of the lamp current detection circuit 5 and the high voltage generation circuit 6.

The lamp current value is input to the non-inverse input terminal of the differential amplification circuit 9.

The output side of the differential amplification circuit 9 is connected to the control circuit 10.

Thus, the differential amplification circuit 9 calculates the difference between the target current value and the lamp current value and transmits it to the control circuit 10.

A drive power supply of the control circuit 10 is connected to the direct-current power supply 2, and the control circuit 10 is operated by turning on the direct-current power supply 2.

A control line d of the control circuit 10 is connected to the base of the transistor Tr.

The control circuit 10 is a PWM control circuit, which controls on-duty of the transistor Tr and varies the output of the power conversion device 3 so as to make the differential output of the differential amplification circuit 9 zero or approximate to zero.

That is, making the differential output of the differential amplification circuit 9 approximate to zero is making the target current value approximate to the lamp current value detected by the lamp current detection circuit 5.

The differential amplification circuit 9 and the control circuit 10 are control means for controlling the semiconductor switch of the power conversion circuit 3 so as to make the target current value approximate to the lamp current value detected by the lamp current detection circuit 5.

The target power setting device 11 is supplied power from the direct-current power supply 2 and is thereby operated.

The output side of the target power setting device 11 is connected to the negative electrode side of the direct-current power supply 2 through a series circuit of a resistor R4 and a capacitor C2.

A discharging resistor R5 is connected parallel to the capacitor C2.

Further, a junction point between the resistor R4 and the capacitor C2 is connected to the input side of the target power setting device 11.

The voltage at both ends of the capacitor C2, i.e. the charging voltage thereof is input to the target power setting device 11.

The capacitor C2 is charged with the current correlating with the target power value transmitted from the target power setting device 11 to the current operation circuit 8.

Specifically, the capacitor C2 is charged with the current proportional to or approximately proportional to the target power value.

The series circuit of the resistor R4 and the capacitor C2 and a discharging resistor R5 constitute the timer circuit 12.

The capacitor C2 is an electrolytic capacitor having a large capacity, and the discharging resistor R5 has a large resistance value at, for example, hundreds of k$\Omega$.

The charging voltage of the capacitor C2 is discharged through the discharging resistor R5, in proportion to or approximate proportion to the drop of the temperature of the high-pressure discharge lamp 7.

The discharging time of the resistor R5 is long until the lamp is cooled, for example, 5 minutes.

The capacitor C2 has discharging characteristics correlating with the variation in the drop of the temperature of the high-pressure discharge lamp 7 after turned off.

The target power setting device 11 transmits, when it is turned on, the target power value that is to be supplied to the high-pressure discharge lamp 7 in accordance with the charging voltage of the capacitor C2, to the current operation circuit 8.

The drive power supply of the target power setting device 11 is connected to the direct-current power supply 2, but may be connected to the other power supply to be fed the power.

The driving power supply of the current operation circuit 8 described above and that of the clock circuit 14 to be described later are not shown, but may be connected to the direct-current power supply 2 or the other power supply.

The target power setting device 11 is connected to the clock circuit 14 that serves as a clock means for clocking the duration of operation at the output side.

The output side of the clock circuit 14 starts the clocking operation simultaneously with the transmission of the target power value from the target power setting device 11 to the current operation circuit 8.

The clock circuit 14 clocks the duration of operation and transmits it to the target power setting device 11.

The target power setting device 11 comprises an integrated circuit (IC) including a CPU, a memory and the like. The internal memory stores the target power value to be supplied to the high-pressure discharge lamp 7 in accordance with the duration shown in FIG. 2 and also stores the target power value to be supplied to the high-pressure discharge lamp 7 in accordance with the charging voltage of the capacitor C2 of the timer circuit 12.

The target power setting device 11 transmits, when it is turned on, the target power value corresponding to the charging voltage of the capacitor C2 to the current operation circuit 8 and, after that, renews the target power value in accordance with the clocked duration and transmits it to the current operation circuit 8.

That is, the target power setting device 11 is constituted to be capable of setting the target power value on the basis of the charging voltage of the capacitor C2 of the timer circuit 12 and varying the target power value in accordance with the duration of operation, when the operation is started.

Thus, the target power setting device 11 is constituted to be capable of setting the power to be supplied from the power conversion device 3 to the high-pressure discharge lamp 7.

Figure 2:
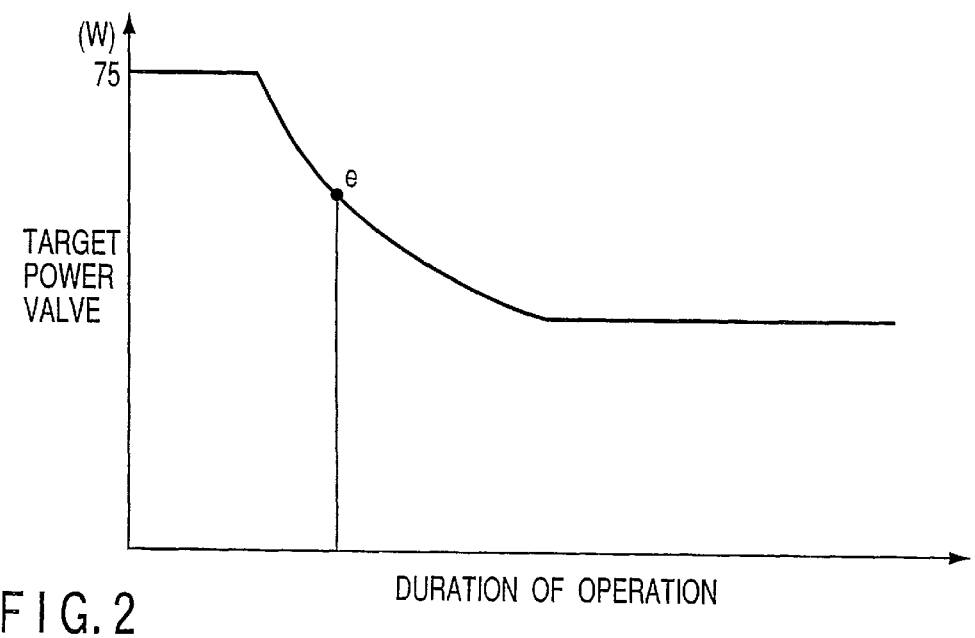
FIG. 2 is a view to explain a target power value to be set by a target power setting device shown in FIG. 1.

The variation of the target power value supplied to the high-pressure discharge lamp 7 in accordance with the duration of operation as shown in FIG. 2, depends on the kind, power, shape and the like of the high-pressure discharge lamp 7, various conditions such as an atmosphere around the high-pressure discharge lamp 7, etc.

The current operation circuit 8, the target power setting device 11, the timer circuit 12, the clock circuit 14 and the like may be micro-computers operated by predetermined programs.

Next, the operations of the first embodiment of the present invention will be explained.

When the direct-current power supply 2 is turned on, the transistor Tr of the power conversion circuit 3 is chopped by the drive of the control circuit 10, and a no-load output voltage (400 to 500V) is generated at the output side of the power conversion circuit 3, i.e. at both ends of the smoothing capacitor C1.

The output voltage energizes the high-pressure discharge lamp 7 and generates a high-voltage pulse in the high-voltage generation circuit 6.

The high-pressure discharge lamp 7 starts the operation by applying this high-voltage pulse to the high-pressure discharge lamp 7.

After starting the operation, the high-pressure discharge lamp 7 receives the power from the smoothing capacitor C1 of the power conversion circuit 3 and is kept turned on.

When the high-pressure discharge lamp 7 is turned on, the high-voltage generation circuit 6 stops generation of the high-voltage pulse.

The direct-current power supply 2 is turned on, and the power is fed to the current operation circuit 8, the target power setting device 11 and the clock circuit 14 to drive them.

The target power setting device 11 sets the power to be supplied from the power conversion device 3 to the high-pressure discharge lamp 7 in accordance with the charging voltage of the capacitor C2 of the timer circuit 12 and transmits it to the current operation circuit 8.

That is, since the charging voltage of the capacitor C2 is zero at the initial startup of the operation, the target power setting device 11 transmits the target power value obtained when the duration of operation is zero as shown in FIG. 2 and transmits it to the current operation circuit 8.

The target power value at the initial startup of operation is 75 W, for the metal halide lamp of the rated power at 35 W that serves as the high-pressure discharge lamp 7.

The target power setting device 11 transmits the target power value to the current operation circuit 8 and also transmits the operation signal to the clock circuit 14.

The clock circuit 14 clocks the duration of operation and transmits it to the target power setting device 11.

The target power setting device 11 transmits the target power value corresponding to the duration of operation shown in FIG. 2 to the current operation circuit 8.

Further, the target power setting device 11 supplies the current correlating with the target power value, for example, the current proportional to the target power value to the series circuit of the resistor R4 and the capacitor C2 in the timer circuit 12 to charge the capacitor C2.

The capacitor C2 is gradually charged and, finally, fully charged.

The current operation circuit 8 substracts the target power value which is set by the target power setting device 11, by the lamp voltage detected by the lamp voltage detection circuit 4, to calculate the target current value, and transmits it to the inverse input terminal of the differential amplification circuit 9.

The lamp current detected by the lamp current detection circuit 5 is input to the non-inverse input terminal of the differential amplification circuit 9.

The differential amplification circuit 9 compares the target current value with the lamp current, calculates the difference therebetween, amplifies the difference and transmits it to the control circuit 10.

The control circuit 10 makes the on-duty of the chopping of the transistor Tr variable so as to make the difference transmitted from the differential amplification circuit 9 zero or approximate to zero.

Thus, the output of the power conversion device 3 is made variable, and the power to be supplied to the high-pressure discharge lamp 7 becomes the target power value or approximates to the target power value.

Making the difference transmitted from the differential amplification circuit 9 zero or approximate to zero, is to make the target current value equal to or approximate to the lamp current value detected by the lamp current detection circuit 5.

When the direct-current power supply 2 is broken, the high-pressure discharge lamp 7 is turned off since the power is not fed to the control circuit 10, the high-pressure discharge lamp 7 or the like.

The lamp temperature of this high-pressure discharge lamp 7 is gradually lowered as the time passes after the high-pressure discharge lamp 7 is turned off.

On the other hand, the charging voltage of the capacitor C2 in the timer circuit 12 is discharged by the discharging resistor R5 and is lowered.

At this time, the control circuit (IC) of the target power setting device 11 correlates the lamp temperature with the charging voltage of the capacitor C2.

When the direct-current power supply 2 is turned on again, the target power setting device 11 sets the target power value on the basis of the charging voltage of the capacitor C2.

That is, the target power setting device 11 sets the overvoltage as the high-pressure discharge lamp 7 is more approximate to a cold state, or sets the power approximate to the rated power value as it is more approximate to a hot state.

Thus, the target power value that has been set by the target power setting device 11 is transmitted to the current operation circuit 8.

Simultaneously with this, the clock circuit 14 starts the clocking operation.

The target power setting device 11 varies the target power value in accordance with the duration of operation of the clock circuit 14 and transmits it to the current operation circuit 8.

At this time, the target power setting device 11 sets the target power value in accordance with the duration of operation, to be varied from the target power value that has been set on the basis of the charging voltage of the capacitor C2.

For example, after the power at the point e in FIG. 2 has been set at the restart, the point e is the startup for the duration of operation. After that, the target current value is set on the basis of the characteristics shown in the figures, in accordance with the duration of operation.

Thus, the power applied from the high-voltage generation circuit 6 to the high-pressure discharge lamp 7 is controlled by the power conversion device 3 so as to become the power corresponding to the target power value.

That is, in this case, the capacitor C2 in the timer circuit 12 is charged with the current correlating with the target power value and then discharging is executed while correlating with the lamp temperature.

The target power setting device 11 can supply an optimal power corresponding to the state of the lamp temperature from the power conversion device 3 to the high-pressure discharge lamp 7 since the target power setting device 11 sets the target power value on the basis of the charging voltage of the capacitor C2 at the startup and varies (lowers) it in accordance with the duration of operation.

FIG. 3 is a circuit diagram showing a high-pressure discharge lamp lighting apparatus according to the second embodiment of the present invention.

The same portions as shown in FIG. 1 are denoted by the same reference numerals and their explanation is omitted.

A multiplier circuit 15 is added to a high-pressure discharge lamp lighting apparatus 20 of FIG. 3 as a power detecting means, as compared with the high-pressure discharge lamp lighting apparatus 1.

Further, the junction point b between the resistors R1 and R2 of the lamp voltage detection circuit 4, and the junction point c between the resistor R3 of the lamp current detection circuit 5 and the high-voltage generation circuit 6 are connected to the input side of the multiplier circuit 15.

In this case, the output side of the multiplier circuit 15 is connected, instead of the target power setting device 11 of FIG. 1, to a charging circuit 13 (timer circuit 12) including a series circuit constituted by the resistor R4 and the capacitor C2.

Thus, the multiplier circuit 15 calculates the power value on the basis of the lamp voltage and the lamp current of the high-pressure discharge lamp 7 to be input, and supplies the current correlating with this power value to the capacitor C2 of the charging circuit 13.

That is, the capacitor C2 is charged with the current correlating with the power value.

The power value calculated by the multiplier circuit 15 is the power (quantity of electricity) correlating with the power supplied to the high-pressure discharge lamp 7.

Use of the multiplier circuit 15 is not limited to this.

That is, a circuit for detecting the quantity of electricity correlating with the power supplied to the high-pressure discharge lamp 7 and supplying the current correlating with the quantity of electricity to the capacitor C2 of the charging circuit 13, may be used instead of use of the multiplier circuit 15.

The capacitor C2 is charged with the current correlating with the target power value since the power of the target power value that has been set by the target power setting device 11 is supplied from the power conversion device 3 to the high-pressure discharge lamp 7.

Further, the current operation circuit 8, the differential amplification circuit 9 and the control circuit 10 are control means for controlling the operation of the transistor Tr of the power conversion device 3. They control to make the target power value that has been set by the target power setting device 11 equal to or approximate to the detected quantity of electricity of the high-pressure discharge lamp 7.

When the direct-current power supply 2 is turned on, the high-voltage pulse generated from the high-voltage generation circuit 6 is applied to the high-pressure discharge lamp 7 and the high-pressure discharge lamp 7 is thereby turned on.

The lamp voltage and the lamp current of the high-pressure discharge lamp 7 are detected by the lamp voltage detection circuit 4 and the lamp current detection circuit 5 and are input to the multiplier circuit 15.

The multiplier circuit 15 multiplies and converts the lamp voltage and the lamp current into the power values, and charges the capacitor C2 of the charging circuit 13 with the current correlating with this power, for example, the current proportional to the power.

The following operations are the same as those shown in FIG. 1.

That is, the capacitor C2 of the charging circuit 13 is charged with the current correlating with the lamp power and then discharging is executed while correlating with the lamp temperature.

The target power setting device 11 sets the target power value on the basis of the charging voltage of the capacitor C2 at the startup, and varies (lowers) the target power value in accordance with the duration of operation.

Thus, an optimal power corresponding to the state of the lamp temperature can be supplied from the power conversion device 3 to the high-pressure discharge lamp 7.

The high-pressure discharge lamp 7 can be replaced with a non-mercury-sealed lamp, in the high-pressure discharge lamp lighting apparatus 1 shown in FIG. 1 or high-pressure discharge lamp lighting apparatus 20.

In this case, the non-mercury-sealed lamp is constituted by containing at least some kinds of halides in a sealed container, and substantially mercury is not sealed therein.

This non-mercury-sealed lamp is a lamp containing, for example, one or more kinds of halides selected from a group of Na, Sc and rare earth metals, and one or more kinds of halides of metals that can hardly emit light into the visible range as compared with metals of the halides.

Particularly, the non-mercury-sealed lamp, which does not contain mercury, is preferable with respect to the feature of preventing the environmental pollution.

In addition, since the rise of the luminous flux is quicker in the non-mercury-sealed lamp than in a mercury-contained lamp, the non-mercury-sealed lamp is also preferable with respect to the feature of shortening the period of the state of the overvoltage to be supplied to the lamp at the startup.

Figure 4:
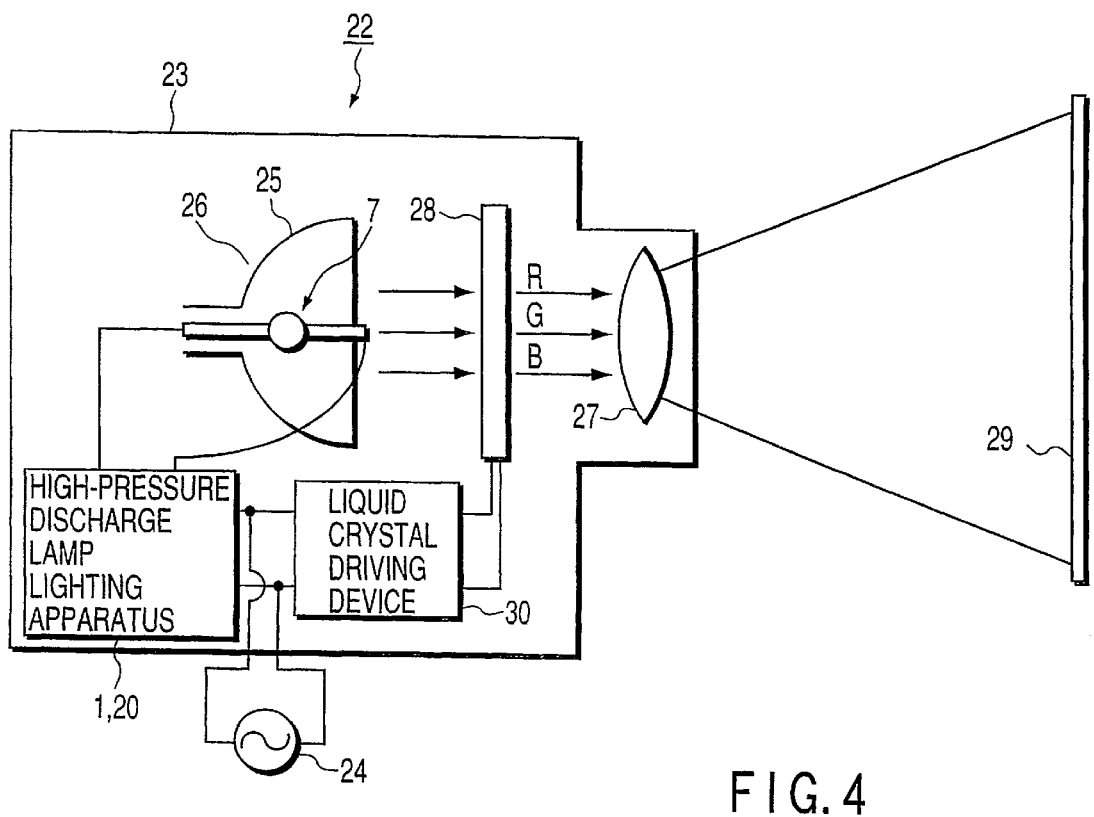
FIG. 4 is a schematically cross-sectional view showing an arrangement of a lighting unit of the present invention.

FIG. 4 is a schematically cross-sectional view showing a lighting unit according to the third embodiment of the present invention.

A lighting unit 22 shown in FIG. 4 is a color liquid-crystal projector, and the high-pressure discharge lamp lighting apparatus 1 shown in FIG. 1 or the high-pressure discharge lamp lighting apparatus 20 shown in FIG. 3 is contained in a lighting unit main body 23.

The high-pressure discharge lamp lighting apparatus 1 or the high-pressure discharge lamp lighting apparatus 20 comprises a direct-current power supply for rectifying and smoothing the alternate-current voltage from a commercial power supply 24 as the above-mentioned direct-current power supply 2.

Further, the lighting unit 22 further comprises a projection light source 26 having the high-pressure discharge lamp 7 and a reflecting mirror 25 for reflecting light irradiated from the high-pressure discharge lamp 7, and a condenser 27 for condensing the light reflected from the reflecting mirror 25.

The reflecting mirror 25 is a light control means that controls the irradiated light of the high-pressure discharge lamp 7.

The light irradiated forward from the projection light source 26 illuminates a color liquid-crystal panel (LCD) 28 to project an image of the color liquid-crystal panel (LCD) 28 formed by the three primary colors RGB onto a screen 29 through the condenser 27.

The liquid-crystal driving device 30 comprises a direct-current power supply for rectifying and smoothing the alternate-current voltage from the commercial power supply 24, and also a liquid-crystal driving circuit for controlling the image of the color liquid-crystal panel (LCD) 28 by receiving the power supplied from the commercial power supply 24.

Thus, images of three colors are projected from the color liquid-crystal panel (LCD) 28 through the condenser 27, and overlapped on the screen 29.

The lighting unit 22 is not limited to a liquid-crystal projector, and may be any lighting unit that contains the high-pressure discharge lamp lighting apparatus 1 shown in FIG. 1 or the high-pressure discharge lamp lighting apparatus 20 shown in FIG. 3 in the lighting unit main body 23.

According to this embodiment, since the projection light source 26 comprises the high-pressure discharge lamp 7 that receives an optimal power in response to the state of the lamp temperature, makes the luminous flux rise quickly and is capable of making the life of lamp longer, it is possible to provide the lighting unit 22 that has many characteristics of goods and does not require much maintenance of the exchange of the lamp.

Figure 5A:
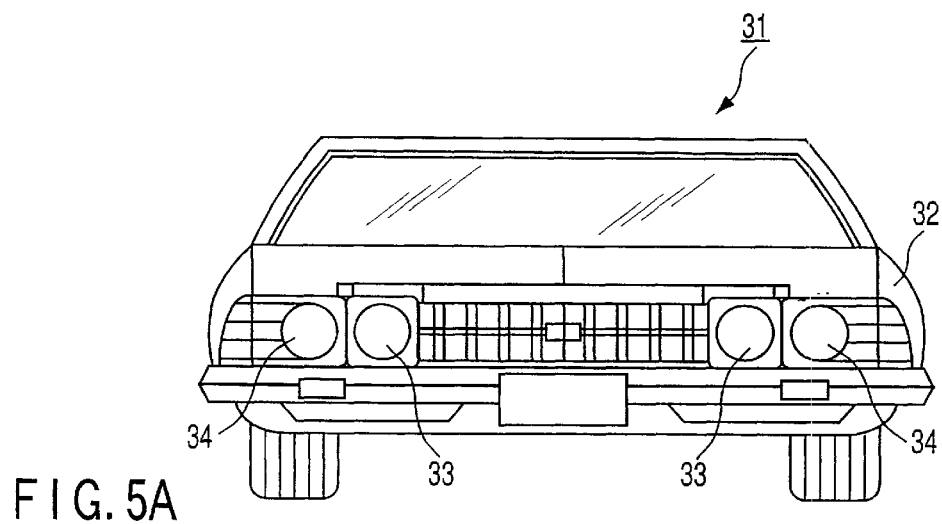
FIG. 5A is a front view showing an arrangement of a vehicle in which the lighting unit of the present invention is loaded.
Figure 5B:
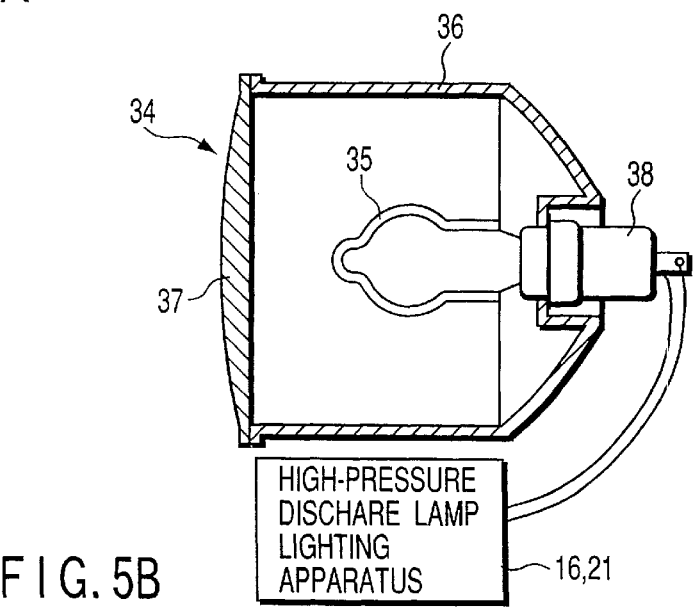
FIG. 5B is a schematically cross-sectional view showing the headlight shown in FIG. 5A.
Figure 6:
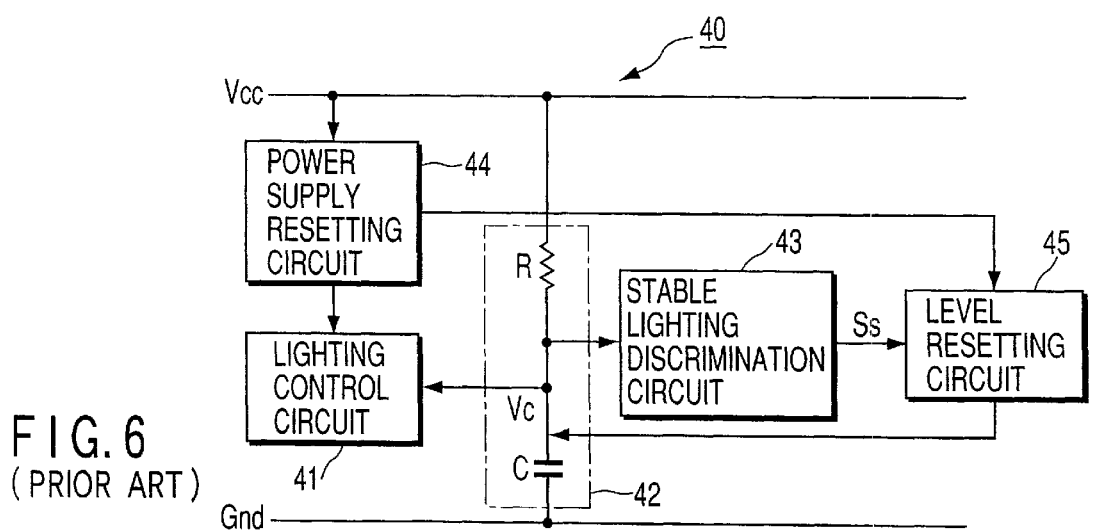
FIG. 6 is a block diagram showing an arrangement of a conventional discharge lamp lighting apparatus.

FIG. 5A is a front view showing a vehicle to which the fourth embodiment of the present invention is applied, and FIG. 5B is a schematically cross-sectional view showing the headlight shown in FIG. 5A.

In FIG. 5A, a vehicle 31 is an automobile, which comprises four headlights forming a pair of high beams 33, 33 and a pair of low beams 34, 34 in the front surface of a vehicle main body 32.

The headlights 33, 33 for the high beams contain halogen lamps, and the headlights 34, 34 for the low beams contain high-pressure discharge lamps 35.

In addition, the high-pressure discharge lamp lighting apparatus 16 shown in FIG. 1 or the high-pressure discharge lamp lighting apparatus 21 shown in FIG. 3 is provided under the headlight 34 for the low beam.

As shown in FIG. 5B, the headlight 34 for the low beam comprises a condenser 37 on the front surface of a housing 36, and the high-pressure discharge lamp 35 is contained inside the housing 36 via a lamp socket 38.

The high-pressure discharge lamp 35 is energized and turned on by the high-pressure discharge lamp lighting apparatus 16 or 21 in the above-mentioned manner.

That is, according to the fourth embodiment, since the present invention comprises the high-pressure discharge lamp lighting apparatus 16 or 21 that can supply an optimal power responding to the state of the lamp temperature to the high-pressure discharge lamp 35 at the startup and that can allow the luminous flux to rise certainly and make the life of the lamp longer, it is possible to provide the vehicle 31 with high reliability.

Therefore, according to the present invention, since the target power value is set on the basis of the charging voltage of the capacitor and is lowered in accordance with the duration of the operation at the startup of the operations, an optimal power can be supplied to the high-pressure discharge lamp.

Further, according to the present invention, since an optimal power can be supplied in accordance with the state of the lamp temperature, the luminous flux can rise quickly and the life of the lamp can be made longer.

Moreover, according to the present invention, since the target power value is renewed by the target power setting device in accordance with the clocked duration, an optimal power is supplied to the high-pressure discharge lamp and thereby the life of the lamp can be made longer.

In addition, according to the present invention, the capacitor is charged with the current correlating with the target power value, the target power value is set on the basis of the charging voltage of the capacitor by the target power setting device at the startup, and the target power value is varied (lowered) in accordance with the duration of the operations. Therefore, the present invention can provide the high-pressure discharge lamp lighting apparatus that can supply an optimal power responding to the state of the lamp temperature to the high-pressure discharge lamp.

In addition, according to the present invention, since the non-mercury-contained lamp that does not contain mercury is used as the high-pressure discharge lamp, it can prevent environmental pollution. Further, since the rise of the luminous flux is quicker in the non-mercury-contained lamp than in the mercury-contained lamp, the period of the overpower supplied to the lamp can be shortened at the startup.

In addition, the present invention comprises the high-pressure discharge lamp lighting apparatus that can supply an optimal power responding to the state of the lamp temperature to the lamp, allow the luminous flux to rise quickly and make the life of the lamp longer. The present invention can thereby provide a vehicle with high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting a target power value to be supplied from the power conversion device to the high-pressure discharge lamp;

power detection means for detecting quantity of electricity correlating with power supplied to the high-pressure discharge lamp;

control means for controlling an operation of the semiconductor switch of the power conversion device so as to make the target power value set by the target power setting device approximate to the quantity of electricity detected by the power detection means; and a charging circuit having a capacitor constituted to be charged with a current correlating with the target power value set by the target power setting device, wherein the target power setting device sets the target power value on the basis of a charging voltage of the capacitor in the charging circuit when operations are started, and lowers the target power value in accordance with a duration of operations.

2. A lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting power to be supplied from the power conversion device to the high-pressure discharge lamp;

lamp voltage detection means for detecting lamp voltage of the high-pressure discharge lamp;

lamp current detection means for detecting lamp current of the high-pressure discharge lamp;

current calculation means for dividing a target power value set by the target power setting device, by the lamp voltage detected by the lamp voltage detection means, to calculate a target current value;

control means for controlling an operation of the semiconductor switch in the power conversion device so as to make the target current value calculated by the current calculation means approximate to the lamp current value detected by the lamp current detection means; and a timer circuit having a resistor and a capacitor constituted to be charged with current correlating with the target power value, wherein the target power setting device is constituted to set the target power value on the basis of charging voltage of the capacitor in the timer circuit when operations are started, and to be capable of varying the target power value in accordance with a duration of operations.

3. A lighting apparatus for a high-pressure discharge lamp according to claim 1 or 2, wherein the capacitor has discharge characteristics correlating with variation in temperature drop after the high-pressure discharge lamp is turned off.

4. A lighting apparatus for a high-pressure discharge lamp according to any one of claims 1 to 3, wherein the lighting apparatus for a high-pressure discharge lamp further comprises clocking means for clocking a duration of operations and the target power setting device renews the target power value in accordance with the duration clocked by the clocking means.

5. A high-pressure discharge lamp lighting apparatus comprising:

a) a lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting a target power value to be supplied from the power conversion device to the high-pressure discharge lamp;

power detection means for detecting quantity of electricity correlating with power supplied to the high-pressure discharge lamp;

control means for controlling an operation of the semiconductor switch of the power conversion device so as to make the target power value set by the target power setting device approximate to the quantity of electricity detected by the power detection means; and a charging circuit having a capacitor constituted to be charged with current correlating with the target power value set by the target power setting device, wherein the target power setting device sets the target power value on the basis of charging voltage of the capacitor in the charging circuit when operations are started and lowers the target power value in accordance with a duration of operations, and b) the high-pressure discharge lamp energized by the power conversion device.

6. A high-pressure discharge lamp lighting apparatus comprising:

a) a lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting power to be supplied from the power conversion device to the high-pressure discharge lamp;

lamp voltage detection means for detecting lamp voltage of the high-pressure discharge lamp;

lamp current detection means for detecting lamp current of the high-pressure discharge lamp;

current calculation means for dividing a target power value set by the target power setting device, by the lamp voltage detected by the lamp voltage detection means, to calculate a target current value;

control means for controlling an operation of the semiconductor switch in the power conversion device so as to make the target current value calculated by the current calculation means approximate to the lamp current value detected by the lamp current detection means; and a timer circuit having a resistor and a capacitor constituted to be charged with current correlating with the target power value, wherein the target power setting device is constituted to set the target power value on the basis of charging voltage of the capacitor in the timer circuit when operations are started, and to be capable of varying the target power value in accordance with a duration of operations, and b) the high-pressure discharge lamp energized by the power conversion device.

7. A high-pressure discharge lamp lighting apparatus according to claim 5 or 6, wherein the high-pressure discharge lamp is a non-mercury-contained lamp that does not seal mercury in an arc tube thereof.

8. A lighting unit comprising:

a) a high-pressure discharge lamp lighting apparatus comprising:

a1) a lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting a target power value to be supplied from the power conversion device to the high-pressure discharge lamp;

power detection means for detecting quantity of electricity correlating with power supplied to the high-pressure discharge lamp;

control means for controlling an operation of the semiconductor switch of the power conversion device so as to make the target power value set by the target power setting device approximate to the quantity of electricity detected by the power detection means; and a charging circuit having a capacitor constituted to be charged with current correlating with the target power value set by the target power setting device, wherein the target power setting device sets the target power value on the basis of charging voltage of the capacitor in the charging circuit when operations are started and lowers the target power value in accordance with a duration of operations, and a2) the high-pressure discharge lamp energized by the power conversion device, and b) a lighting fitting main body having light control means for controlling light emitted from the high-pressure discharge lamp.

9. A lighting unit comprising:

a) a high-pressure discharge lamp lighting apparatus comprising:

a1) a lighting apparatus for a high-pressure discharge lamp comprising:

a power conversion device with a variable output, comprising a semiconductor switch for chopping direct current and having an output side connected to a high-pressure discharge lamp;

a high-voltage generation circuit for applying high voltage to the high-pressure discharge lamp on the basis of the output from the power conversion device, to turn on the high-pressure discharge lamp;

a target power setting device constituted to be capable of setting power to be supplied from the power conversion device to the high-pressure discharge lamp;

lamp voltage detection means for detecting lamp voltage of the high-pressure discharge lamp;

lamp current detection means for detecting lamp current of the high-pressure discharge lamp;

current calculation means for dividing a target power value set by the target power setting device, by the lamp voltage detected by the lamp voltage detection means, to calculate a target current value;

control means for controlling an operation of the semiconductor switch in the power conversion device so as to make the target current value calculated by the current calculation means approximate to the lamp current value detected by the lamp current detection means; and a timer circuit having a resistor and a capacitor constituted to be charged with current correlating with the target power value, wherein the target power setting device is constituted to set the target power value on the basis of charging voltage of the capacitor in the timer circuit when operations are started, and to be capable of varying the target power value in accordance with a duration of operations, and a2) the high-pressure discharge lamp energized by the power conversion device, and b) a lighting fitting main body having light control means for controlling light emitted from the high-pressure discharge lamp.

10. A lighting unit according to claim 8 or 9, wherein the lighting unit is loaded on a vehicle and the light control means of the lighting unit is constituted to be applied as a headlight of the vehicle.

* * * * *